(12) United States Patent
Mahadik et al.

(10) Patent No.: US 10,860,544 B2
(45) Date of Patent: Dec. 8, 2020

(54) SYSTEMS AND METHODS FOR WRITE-ONCE-READ-MANY STORAGE

(71) Applicant: Veritas Technologies LLC, Mountain View, CA (US)

(72) Inventors: Pooja Mahadik, Ratnagiri (IN); Brad Boyer, San Jose, CA (US); Anindya Banerjee, Pune (IN)

(73) Assignee: Veritas Technologies LLC, Santa Clara, CA (US)

( * ) Notice: Subject to any disclaimer, the term of this patent is extended or adjusted under 35 U.S.C. 154(b) by 276 days.

(21) Appl. No.: 15/719,502

(22) Filed: Sep. 28, 2017

(65) Prior Publication Data

US 2020/0201944 A1    Jun. 25, 2020

(30) Foreign Application Priority Data

Jul. 31, 2017 (IN) .............................. 201721027062

(51) Int. Cl.
| | |
|---|---|
| *G06F 17/00* | (2019.01) |
| *G06F 16/18* | (2019.01) |
| *G06F 16/13* | (2019.01) |
| *G06F 16/11* | (2019.01) |
| *G06F 16/16* | (2019.01) |

(52) U.S. Cl.
CPC .......... *G06F 16/181* (2019.01); *G06F 16/125* (2019.01); *G06F 16/13* (2019.01); *G06F 16/162* (2019.01)

(58) Field of Classification Search
CPC ...... G06F 16/181; G06F 16/162; G06F 16/13; G06F 16/125; G06F 16/18; G06F 16/1805; G06F 16/185
See application file for complete search history.

(56) References Cited

U.S. PATENT DOCUMENTS

| | | | | |
|---|---|---|---|---|
| 7,366,834 B2* | 4/2008 | McGovern | ............ | G06F 3/0623 711/112 |
| 8,200,721 B2* | 6/2012 | Hsu | ........................ | G06F 16/181 707/821 |
| 8,516,022 B1* | 8/2013 | Kanteti | ................. | G06F 16/181 707/827 |

(Continued)

OTHER PUBLICATIONS

"WORM (write once, read many)" (date unknown) http://searchstorage.techtarget.com/definition/WORM-write-once-read-many.

(Continued)

*Primary Examiner* — Greta L Robinson
(74) *Attorney, Agent, or Firm* — FisherBroyles, LLP

(57) ABSTRACT

The disclosed computer-implemented method for write-once-read-many storage may include (1) receiving, at a file system on the computing device, a request to assign a write-once-read-many (WORM) attribute to a file, wherein the request is received from an application, (2) setting, in response to the request to assign the WORM attribute to the file, a WORM flag in an extended attribute associated with the file, and (3) associating with the file, in response to the setting of the WORM flag, a retention period attribute and read-only access until the end of the retention period. The provided systems and methods may provide per-file WORM support at a file system level using extended attributes of the file system. Various other methods, systems, and computer-readable media are also disclosed.

20 Claims, 3 Drawing Sheets

(56) References Cited

U.S. PATENT DOCUMENTS

| | | | |
|---|---|---|---|
| 9,639,540 B2* | 5/2017 | Sparkes | G06F 16/1774 |
| 2004/0186858 A1* | 9/2004 | McGovern | G06F 16/181 |
| 2009/0132774 A1* | 5/2009 | Bondurant | G06F 3/0605 |
| | | | 711/161 |
| 2012/0221811 A1* | 8/2012 | Sparkes | G06F 16/125 |
| | | | 711/159 |
| 2017/0060885 A1* | 3/2017 | Gangadharaiah | G06F 16/125 |
| 2018/0267980 A1* | 9/2018 | Neria | G06F 16/181 |

OTHER PUBLICATIONS

"Write-Once, Read-Many (WORM)" https://www.techopedia.com/definition/27405/write-once-read-many-worm-data-storage (date unknown).

"Write once, read many (WORM) using Linux file system" https://serverfault.com/questions/548765/write-once-read-many-worm-using-linux-file-system (date unknown).

"BlueArc WORM File System" http://www.moderntech.com.hk/sites/default/files/datasheet/V04_BlueArc-DS-WORM-File-System.pdf (date unknown).

* cited by examiner

SYSTEMS AND METHODS FOR WRITE-ONCE-READ-MANY STORAGE

CROSS REFERENCE TO RELATED APPLICATION

This application is a continuation of Indian Application No. 201721027062, filed Jul. 31, 2017, the disclosure of which is incorporated, in its entirety, by reference.

BACKGROUND

Some platforms store data in central archives and depend on an underlying storage system to retain files in read-only mode until a retention period has expired. Thus, these platforms may expect write-once-read-many storage access from the underlying storage system. However, relying on the underlying storage system to provide security for the files may increase risk of a malware attack that seeks to modify and/or delete the files. Accordingly, the instant disclosure identifies and addresses a need for additional and improved systems and methods for write-once-read-many storage.

SUMMARY

As will be described in greater detail below, the instant disclosure describes various systems and methods for write-once-read-many storage. In one example, a method for write-once-read-many storage may include (1) receiving, at a file system on the computing device, a request to assign a write-once-read-many (WORM) attribute to a file, where the request is received from an application, (2) setting, in response to the request to assign the WORM attribute to the file, a WORM flag in an extended attribute associated with the file, and (3) associating with the file, in response to the setting of the WORM flag, a retention period attribute and read-only access until the end of the retention period.

In some examples, the extended attribute associated with the file may include an additional WORM-related attribute and data indicating a length of the retention period. In some embodiments, the method may include receiving, at the file system layer and from the application, an assignment of the retention period attribute associated with the file. In further examples, the method may include setting the retention period attribute associated with the file in response to at least one of a retention policy and a retention attribute of a parent directory of the file.

Moreover, the method may include receiving, at the file system and from the application, an assignment of at least one of an append-only attribute associated with the file, an automatic deletion attribute associated with the file, an immutability attribute associated with the file, and a secure deletion attribute associated with the file.

In some examples, the method may include enforcing the retention period and the read-only access to the file against all users. Moreover, the method may include receiving a request to read the file and enabling, in response to the request to read the file, reading the file. The request conforms with a common internet file system protocol. In further examples, the method may include performing at least one security action in response to setting the WORM flag.

In one example, a system for write-once-read-many storage may include several modules stored in a memory device, including (1) a receiving module, stored in the memory device, that receives, at a file system on the computing device, a request to assign a write-once-read-many (WORM) attribute to a file, where the request is received from an application, (2) a setting module, stored in the memory device, that sets, in response to the request to assign the WORM attribute to the file, a WORM flag in an extended attribute associated with the file, and (3) an associating module, stored in the memory device, that associates with the file, in response to the setting of the WORM flag, a retention period attribute and read-only access until the end of the retention period, and at least one physical processor that executes the receiving module, the determining module, the setting module, and the associating module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) receive, at a file system on the computing device, a request to assign a write-once-read-many (WORM) attribute to a file, where the request is received from an application, (2) set, in response to the request to assign the WORM attribute to the file, a WORM flag in an extended attribute associated with the file, and (3) associate with the file, in response to the setting of the WORM flag, a retention period attribute and read-only access until the end of the retention period.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
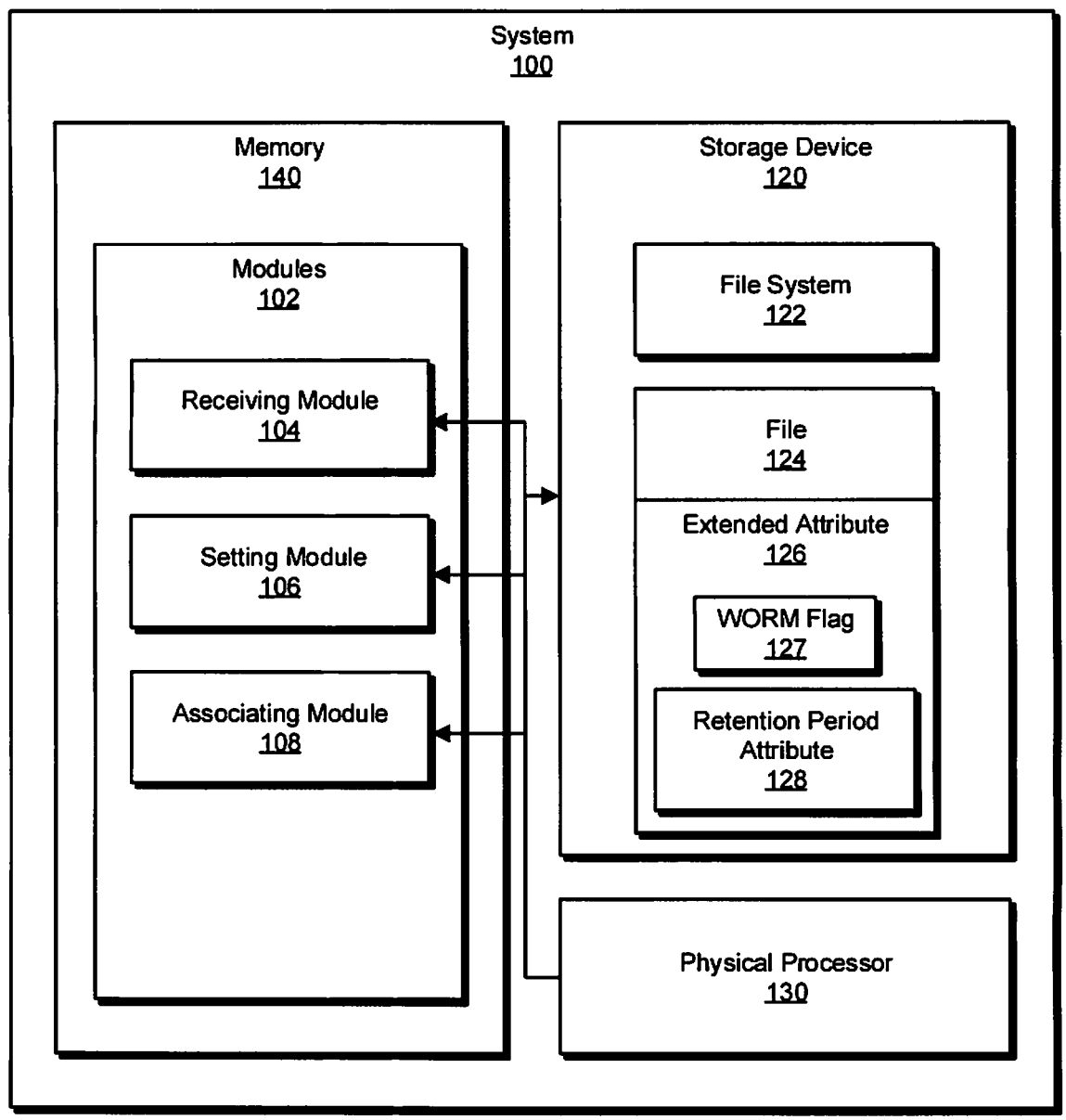
FIG. 1 is a block diagram of an example system for write-once-read-many storage.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for write-once-read-many storage.

Organizations having highly-sensitive data, such as financial institutions and security providers, typically store their business data in a tamper-resistant manner to support critical business operations. To support this demand, for example, enterprise information archive platforms (such as VERITAS' ENTERPRISE VAULT) and other WINDOWS applications may enable organizations to store messaging and file system data in central archives. These applications may expect write-once-read-many (WORM) access. With WORM access, once a file write is committed, only "read-only" access may be allowed to the file during a retention period. The file may be deleted only after the retention period expires.

As will be explained in greater detail below, provided are systems and methods for per-file WORM access provided by a file system. The provided systems and methods may also support different WORM-related properties, including, but not limited to, append-only, auto-delete, immutable, or secure delete of WORM-enabled files. The provided systems and methods may also allow for existing file attributes to be maintained while new WORM attributes are enabled in extended attributes, such as extended attributes of VERITAS' VxFS file system.

In addition, systems and methods described herein may improve functioning of a computing device by providing per-file WORM access control by a file system. These systems and methods may also improve fields of malware protection by thwarting malware attacks. Thus, disclosed systems and methods may provide additional asset protection for common targets of malware, such as hospitals, shipping companies, financial companies, governments, etc. by thwarting malware attacks.

Figure 2:
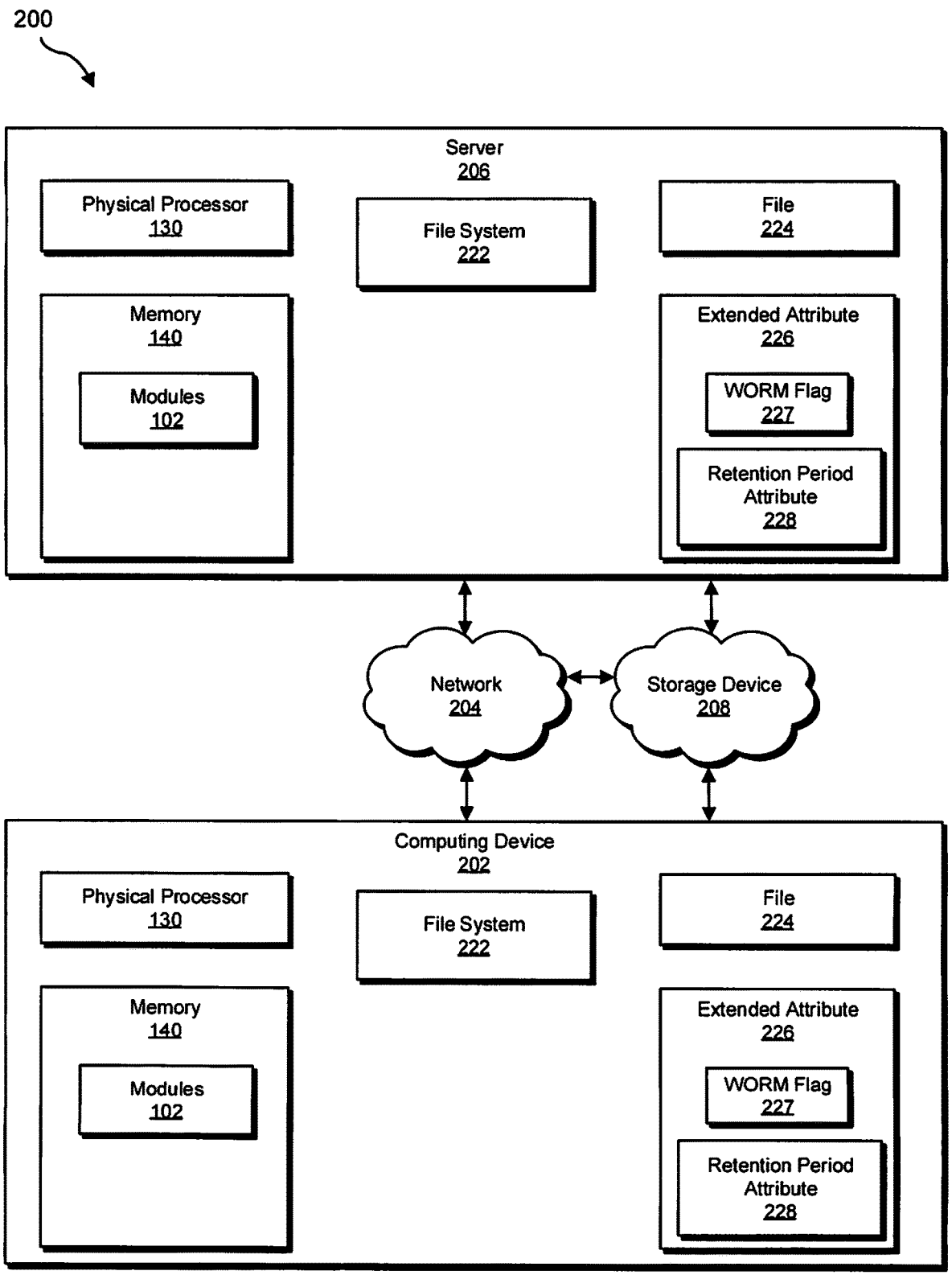
FIG. 2 is a block diagram of an additional example system for write-once-read-many storage.

The following will provide, with reference to FIGS. 1-2, detailed descriptions of example systems for write-once-read-many storage. Detailed descriptions of corresponding computer-implemented methods will also be provided in connection with FIG. 3. In addition, detailed descriptions of example.

FIG. 1 is a block diagram of an example system 100 for write-once-read-many storage. As illustrated in this figure, example system 100 may include one or more modules 102 for performing one or more tasks. As will be explained in greater detail below, modules 102 may include a receiving module 104, a setting module 106, and an associating module 108. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives, (HDDs), Solid-State Drives (SSDs), optical disk drives, caches, variations or combinations of one or more of the same, or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate write-once-read-many storage. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

As illustrated in FIG. 1, example system 100 may also include one or more storage devices, such as storage device 120. Storage device 120 generally represents any type or form of volatile or non-volatile storage device or medium capable of storing data and/or computer-readable instructions. In one example, storage device 120 may store, load, and/or maintain one or more of file system 122, file 124, one or more extended attributes 126, WORM flag 127, and/or retention period attribute 128. Examples of storage device 120 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As used herein, the term "write-once-read-many" or "WORM" may refer to a technique for storing messaging and file system data in information archive platforms in which once a file write is committed, only "read-only" access may be allowed to the file during a retention period, and then the file may be deleted after the retention period expires. When data is stored using a WORM technique, the data may be assigned a retention category and/or policy that may define how long (via, e.g., a retention period) that data must be kept and/or retained in read-only mode. Information archive platforms may then delete the data when the retention period expires.

As used herein, the term "extended attributes" may refer to file attributes associated with a file. In examples, extended attributes may be user defined and/or file-system defined. In examples, extended attributes may be present for some files and not others. In examples, extended attributes may be set by applications and subsequently used by file systems and/or applications. Extended attributes may provide flexibility to file management and enable per-file customized file management capabilities beyond those provided by a file system.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 and a storage device 208 via a network 204. In one example, all or a portion of the functionality of modules 102 may be performed by computing device 202, server 206, and/or any other suitable computing system. As will be described in greater detail below, one or more of modules 102 from FIG. 1 may, when executed by at least one processor of computing device 202 and/or server 206, enable computing device 202 and/or server 206 to facilitate write-once-read-many storage of file 124 in storage device 208.

Computing device 202 generally represents any type or form of computing device capable of reading computer-executable instructions. For example, computing device 202 may represent an endpoint device running client-side software. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, Internet-of-Things devices (e.g., smart appliances, etc.), gaming consoles, variations or combinations of one or more of the same, or any other suitable computing device. As illustrated in FIG. 2, computing device 202 may also store, load, and/or maintain one or more of file system 222, file 224, one or more extended attributes 226, WORM flag 227, and/or retention period attribute 228.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, or any other suitable network.

Server 206 generally represents any type or form of computing device that is capable of reading computer-executable instructions. For example, server 206 may represent a cloud-based storage management server running server-side software. Additional examples of server 206 include, without limitation, storage servers, database servers, application servers, and/or web servers configured to run certain software applications and/or provide various storage, database, and/or web services. Although illustrated as a single entity in FIG. 2, server 206 may include and/or represent a plurality of servers that work and/or operate in conjunction with one another. As illustrated in FIG. 2, Server 206 may also store, load, and/or maintain one or more of file system 222, file 224, one or more extended attributes 226, WORM flag 227, and/or retention period attribute 228.

Storage device 208 generally represents any type or form of volatile or non-volatile storage device or medium capable of storing data and/or computer-readable instructions. In one example, storage device 208 may store, load, and/or maintain one or more of file system 122, file 124, one or more extended attributes 126, WORM flag 127, and/or retention period attribute 128. Examples of storage device 208 include, without limitation, Random Access Memory (RAM), Read Only Memory (ROM), flash memory, Hard Disk Drives (HDDs), Solid-State Drives (SSDs), optical disk drives, caches, cloud-based storage devices, a file server, variations or combinations of one or more of the same, and/or any other suitable storage memory.

Many other devices or subsystems may be connected to computing system 100 in FIG. 1 and/or computing system 200 in FIG. 2. Conversely, all of the components and devices illustrated in FIGS. 1 and 2 need not be present to practice the embodiments described and/or illustrated herein. The devices and subsystems referenced above may also be interconnected in different ways from that shown in FIG. 2. Computing systems 100 and 200 may also employ any number of software, firmware, and/or hardware configurations. For example, one or more of the example embodiments disclosed herein may be encoded as a computer program (also referred to as computer software, software applications, computer-readable instructions, and/or computer control logic) on a computer-readable medium.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Figure 3:
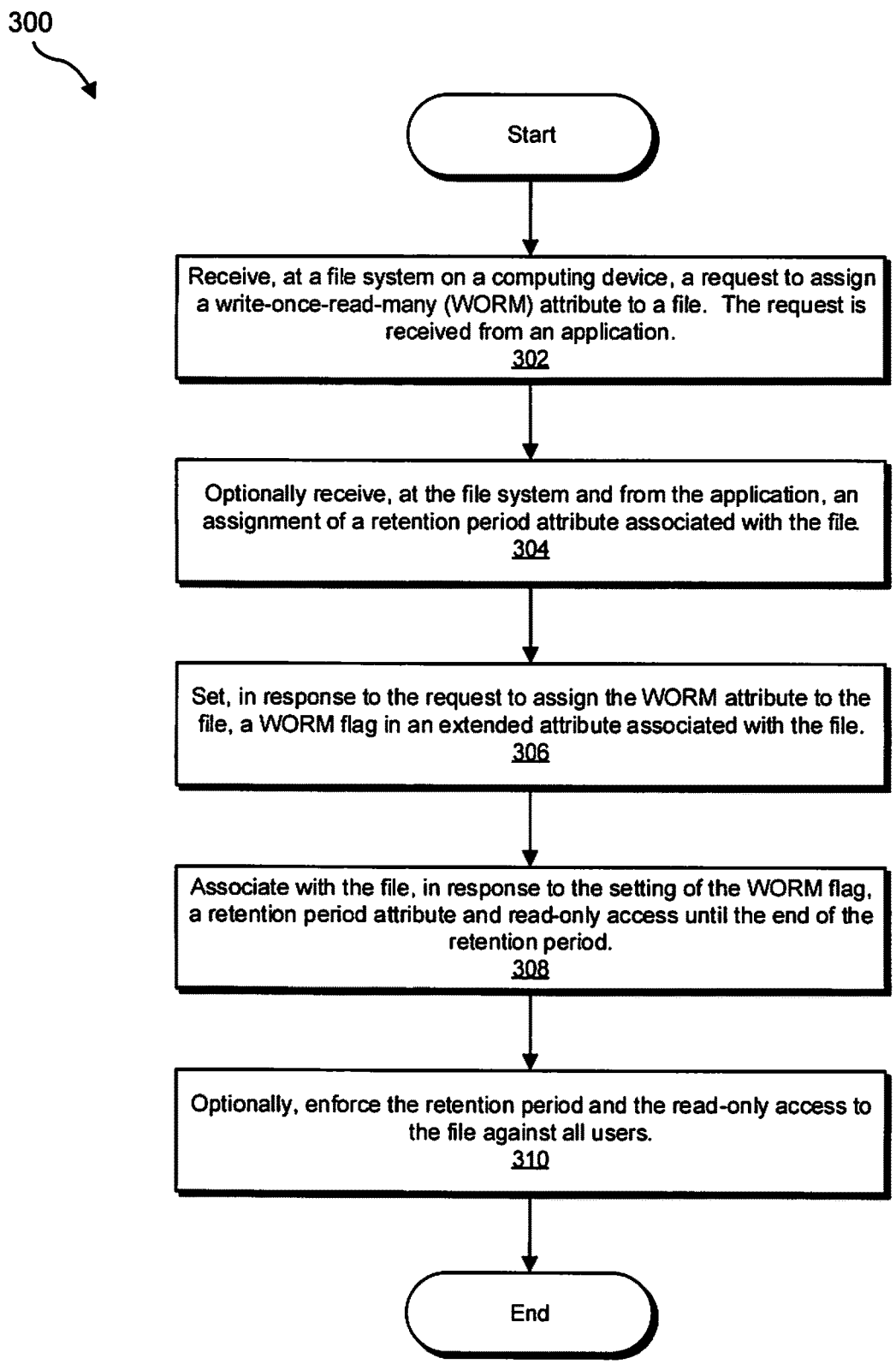
FIG. 3 is a flow diagram of an example method for write-once-read-many storage.

FIG. 3 is a flow diagram of an example computer-implemented method 300 for write-once-read-many storage. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As is described in further detail herein, one or more of the systems described herein may implement write-once-read-many storage. For example, receiving module 104 may, as part of computing device 202 and/or server 206 in FIG. 2, receive, at file system 122 on the computing device, a request to assign a write-once-read-many (WORM) attribute to a file. The request is received from an application. Setting module 106 may, as part of computing device 202 and/or server 206 in FIG. 2, set, in response to the request to assign the WORM attribute to file 124, a WORM flag 127 in an extended attribute 126 associated with file 124. Further, associating module 108 may, as part of computing device 202 and/or server 206 in FIG. 2, associate with file 124, in response to the setting of WORM flag 127, a retention period attribute 128 and read-only access until the end of the retention period.

In some examples, a potential security risk associated with the process may be identified in response to setting the WORM flag, and, in response to identifying the potential security risk, a security action may be performed in an attempt to ameliorate the potential security risk. For example, first receiving module 104 may identify a potential security risk associated setting WORM flag 127 and/or an attempt to access file 124. First receiving module 104 may in response perform a security action in an attempt to ameliorate the potential security risk. The security action may include stopping computer-implemented method 300. The security action may also include notifying computing device 202 and/or server 206 of the potential security risk associated with setting WORM flag 127 and/or accessing file 124.

As illustrated in FIG. 3, at step 302 one or more of the systems described herein may receive, at a file system on a computing device, a request to assign a write-once-read-many (WORM) attribute to a file. The request may be received from an application, such as a WINDOWS-compatible application that stores data. For example, receiving module 104 may, as part of computing device 202 and/or server 206 in FIG. 2, receive, at file system 122 on the computing device, a request to assign a write-once-read-many (WORM) attribute to a file.

As illustrated in FIG. 3, at optional step 304, one or more of systems described herein may receive, at the file system and from the application, an assignment of a retention period attribute associated with the file. In some examples, the retention period attribute associated with the file may be set in response to a retention policy and/or a retention attribute of a parent directory of the file. In additional examples, the extended attribute associated with the file includes an additional WORM-related attribute and may include data indicating a length of the retention period, such as the received retention period attribute. For example, receiving module 104 may, as part of computing device 202 and/or server 206 in FIG. 2, receive, at file system 122 and from the application, an assignment of retention period attribute 128 associated with file 124.

In further examples, at least one additional assignment may be received, at the file system and from the application. For example, receiving module 104 may, as part of computing device 202 and/or server 206 in FIG. 2, receive, at file system 122 and from the application, at least one additional assignment of one or more extended attribute 126 associated with file 124. The additional assignment may include an append-only attribute to associate with the file. If the append-only attribute is set, the method 300 may also include enabling the file to be appended. In examples, only certain users, such as a user having superuser privileges, administrator privileges, or the like, may be enabled to append the file. Additionally or alternatively, appending the file does not include enabling of deletion of at least a portion of the file.

The additional assignment may include an automatic deletion attribute to associate with the file. If the automatic deletion attribute is set, the method 300 may also include automatically deleting the file when the retention period expires. In examples, the additional assignment may include an immutability attribute to associate with the file. If the immutability attribute is set, the method 300 may also include preventing, in response to the assigning of the immutability attribute, changing of the file. In some examples, the additional assignment may include a secure deletion attribute to associate with the file. If the secure deletion attribute is set, the method 300 may also include deleting the file in a secure manner.

As illustrated in FIG. 3, at step 306, one or more of systems described herein may set, in response to the request to assign the WORM attribute to the file, a WORM flag in an extended attribute associated with the file. WORM flags may identify that WORM-related file operations are or are not enabled for the associated files. For example, setting module 106 may, as part of computing device 202 and/or server 206 in FIG. 2, set, in response to the request to assign the WORM attribute to file 124, a WORM flag 127 in an extended attribute 126 associated with file 124. Using extended attributes to store WORM-related information may provide per-file support while not altering or interfering with basic file attributes. In some examples, a WORM flag may be set for a file directory, and by extension, all files resident in that directory. In further embodiments, a Samba-VxFS plugin may be enhanced to set WORM attributes and enable WORM file access.

As illustrated in FIG. 3, at step 308, one or more of systems described herein may associate with the file, in response to the setting of the WORM flag, a retention period attribute and read-only access until the end of the retention period. For example, associating module 108 may, as part of computing device 202 and/or server 206 in FIG. 2, associate with file 124, in response to the setting of WORM flag 127, a retention period attribute 128 and read-only access until the end of the retention period.

As illustrated in FIG. 3, at optional step 310, one or more of systems described herein may enforce the retention period and the read-only access to the file against all users. For example, file system 122 has complete control over modifications of file 124 and enforces read-only access of file 124 against a full superuser account. For example, the file system prevents a superuser from turning off WORM status. In some examples, a request to read the file may be received. The request may be in a message that conforms with a common internet file system (CIFS) protocol. In response to the request to read the file, an application may be enabled to read the file. For example, enterprise vault (EV) applications may access WORM-enabled file systems via CIFS share.

As explained above, the disclosed systems and methods may provide per-file WORM access by a file system. The provided systems and methods may also allow for existing file attributes to be maintained while new WORM attributes are enabled in extended attributes. In addition, systems and methods described herein may improve fields of malware protection by thwarting malware attacks, and may provide additional asset protection for targets of malware.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures may be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the modules described herein may configure a computing system (e.g., a server) to facilitate multi-tenancy for one or more of the functions described herein. For example, one or more of the modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor).

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), variations or combinations of one or more of the same, or any other suitable mobile computing devices. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

The process parameters and sequence of steps described and/or illustrated herein are given by way of example only and may be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using modules that perform certain tasks. These modules may include script, batch, or other executable files that may be stored on a computer-readable storage medium or in a computing system. In some embodiments, these modules may configure a computing system to perform one or more of the example embodiments disclosed herein.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for write-once-read-many storage, at least a portion of the method being performed by a computing device comprising at least one processor, the method comprising:
   receiving, at a file system on the computing device, a request to assign a write-once-read-many (WORM) attribute to a file, wherein the request is received from an application;
   setting, in response to the request to assign the WORM attribute to the file, a WORM flag in an extended attribute associated with the file, wherein the extended attribute is file-system defined and enables per-file customized file management capabilities beyond those provided by a basic file system while not altering or interfering with basic file system attributes; and
   associating with the file, in response to the setting of the WORM flag, a retention period attribute and read-only access until the end of the retention period.

2. The method of claim 1, wherein the extended attribute associated with the file includes:
   an additional WORM-related attribute; and
   data indicating a length of the retention period.

3. The method of claim 1, further comprising receiving, at the file system and from the application, an assignment of the retention period attribute associated with the file.

4. The method of claim 1, further comprising setting the retention period attribute associated with the file in response to at least one of a retention policy and a retention attribute of a parent directory of the file.

5. The method of claim 1, further comprising receiving, at the file system and from the application, an assignment of at least one of:
   an append-only attribute associated with the file;
   an automatic deletion attribute associated with the file;
   an immutability attribute associated with the file; and
   a secure deletion attribute associated with the file.

6. The method of claim 1, further comprising enforcing the retention period and the read-only access to the file against all users.

7. The method of claim 1, further comprising:
   receiving a request to read the file, wherein the request conforms with a common internet file system protocol; and
   enabling, in response to the request to read the file, reading the file.

8. The computer-implemented method of claim 1, further comprising performing at least one security action in response to setting the WORM flag.

9. A system for write-once-read-many storage, the system comprising:
   a memory device;
   a receiving module, stored in the memory device, that receives, at a file system on the computing device, a request to assign a write-once-read-many (WORM) attribute to a file, wherein the request is received from an application;
   a setting module, stored in the memory device, that sets, in response to the request to assign the WORM attribute to the file, a WORM flag in an extended attribute associated with the file, wherein the extended attribute is file-system defined and enables per-file customized file management capabilities beyond those provided by a basic file system while not altering or interfering with basic file system attributes;

an associating module, stored in the memory device, that associates with the file, in response to the setting of the WORM flag, a retention period attribute and read-only access until the end of the retention period; and at least one physical processor that executes the receiving module, the determining module, the setting module, and the associating module.

10. The system of claim 9, wherein the extended attribute associated with the file includes:

an additional WORM-related attribute; and data indicating a length of the retention period.

11. The system of claim 9, further comprising a second receiving module, stored in the memory device, that receives, at the file system and from the application, an assignment of the retention period attribute associated with the file.

12. The system of claim 9, further comprising a second setting module, stored in the memory device, that sets the retention period attribute associated with the file in response to at least one of a retention policy and a retention attribute of a parent directory of the file.

13. The system of claim 9, further comprising a second receiving module, stored in the memory device, that receives, at the file system and from the application, an assignment of at least one of:

an append-only attribute associated with the file;

an automatic deletion attribute associated with the file;

an immutability attribute associated with the file; and a secure deletion attribute associated with the file.

14. The system of claim 9, further comprising an enforcing module, stored in the memory device, that enforces the retention period and the read-only access to the file against all users.

15. The system of claim 9, further comprising:

a second receiving module, stored in the memory device, that receives a request to read the file, wherein the request conforms with a common internet file system protocol; and an enabling module, stored in the memory device, that enables, in response to the request to read the file, reading the file.

16. The system of claim 9, further comprising a performing module, stored in the memory device, that performs at least one security action in response to setting the WORM flag.

17. A non-transitory computer-readable medium comprising one or more computer-executable instructions that, when executed by at least one processor of a computing device, cause the computing device to:

receive, at a file system on the computing device, a request to assign a write-once-read-many (WORM) attribute to a file, wherein the request is received from an application;

set, in response to the request to assign the WORM attribute to the file, a WORM flag in an extended attribute associated with the file, wherein the extended attribute is file-system defined and enables per-file customized file management capabilities beyond those provided by a basic file system while not altering or interfering with basic file system attributes; and associate with the file, in response to the setting of the WORM flag, a retention period attribute and read-only access until the end of the retention period.

18. The non-transitory computer-readable medium of claim 17, wherein the extended attribute associated with the file includes:

an additional WORM-related attribute; and data indicating a length of the retention period.

19. The non-transitory computer-readable medium of claim 17, further comprising one or more computer-executable instructions that, when executed by the at least one processor of the computing device, cause the computing device to receive, at the file system and from the application, an assignment of the retention period attribute associated with the file.

20. The non-transitory computer-readable medium of claim 17, further comprising one or more computer-executable instructions that, when executed by the at least one processor of the computing device, cause the computing device to set the retention period attribute associated with the file in response to at least one of a retention policy and a retention attribute of a parent directory of the file.

* * * * *